(12) United States Patent  
Launay et al.

(10) Patent No.: US 8,033,182 B2  
(45) Date of Patent: Oct. 11, 2011

(54) CAPACITIVE SENSOR FOR MORPHOLOGICAL DISCRIMINATION OF A MOTOR VEHICLE SEAT OCCUPANT

(75) Inventors: Claude Launay, Champigny (FR); Joaquim Da Silva, Sennely (FR); Florent Voisin, Guillerval (FR)

(73) Assignee: Hitachi Computer Products (Europe) S.A.S. (FR)

( * ) Notice: Subject to any disclaimer, the term of this patent is extended or adjusted under 35 U.S.C. 154(b) by 26 days.

(21) Appl. No.: 11/996,960

(22) PCT Filed: Jul. 21, 2006  
(Under 37 CFR 1.47)

(86) PCT No.: PCT/EP2006/064505  
§ 371 (c)(1),  
(2), (4) Date: Jan. 25, 2008

(87) PCT Pub. No.: WO2007/012609  
PCT Pub. Date: Feb. 1, 2007

(65) Prior Publication Data  
US 2008/0211213 A1    Sep. 4, 2008

(30) Foreign Application Priority Data

Jul. 28, 2005    (FR) ..................................... 05 08072

(51) Int. Cl.  
*G01L 1/00* (2006.01)
(52) U.S. Cl. ....................................................... 73/780
(58) Field of Classification Search ............ 73/780, 73/862.625, 862.391, 862, 625; 177/210 C; 280/734, 735; 340/666, 667  
See application file for complete search history.

(56) References Cited

U.S. PATENT DOCUMENTS 3,580,074 A    5/1971    Wescott et al.  
(Continued)

FOREIGN PATENT DOCUMENTS

EP    0257724    3/1988  
(Continued)

OTHER PUBLICATIONS

International Search Report and English Translation for PCT/EP2006/064505, Sep. 15, 2006 (mailing date), Hitachi Computer Products (Europe) S.A.S., International Search Report and English translation for commonly owned PCT Patent Application PCT/EP2006/064505, listed as item #6 above.

(Continued)

*Primary Examiner* — Lisa Caputo  
*Assistant Examiner* — Octavia Davis  
(74) *Attorney, Agent, or Firm* — Adeli & Tollen LLP

(57) ABSTRACT

A detection assembly for detecting a morphology of a person is provided. The assembly includes a sensor and a processing unit. The sensor includes (i) first and second main linear electrodes covering different zones of a plane, and (ii) a third auxiliary linear electrode having substantially at least an open loop shape and almost entirely surrounding the first and second main electrodes in said plane. The processing unit is connected to the electrodes and is for (i) powering the electrodes at controlled voltage levels, (ii) making use of signals taken from the electrodes in the form of ratios between two of the signals, and (iii) delivering binary signals representing a percentage by which a main electrode is covered by comparison of a signal taken from the main electrodes with a predetermined threshold, and analog signals representing a percentage of covering of at least one electrode.

29 Claims, 4 Drawing Sheets

U.S. PATENT DOCUMENTS

Figure 2A:
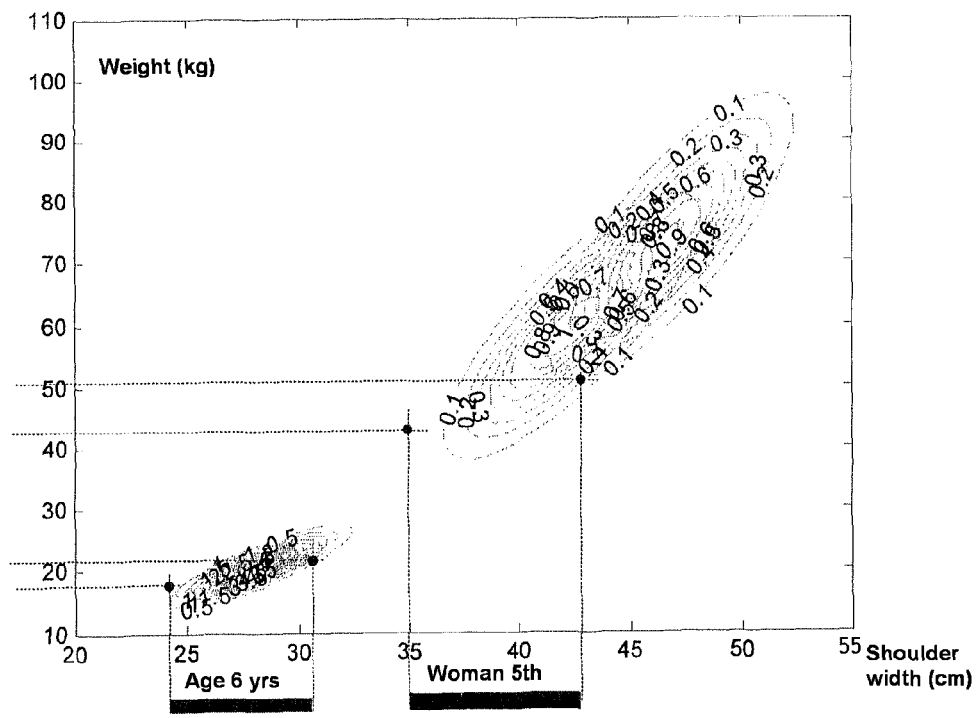

| | | | | |
|---|---|---|---|---|
| 4,485,673 | A | | 12/1984 | Stern |
| 4,526,043 | A | * | 7/1985 | Boie et al. ................ 73/862.046 |
| 5,050,431 | A | | 9/1991 | McDonald |
| 5,406,843 | A | | 4/1995 | Hannan et al. |
| 5,446,391 | A | | 8/1995 | Aoki et al. |
| 5,963,679 | A | * | 10/1999 | Setlak ........................... 382/312 |
| 5,986,221 | A | * | 11/1999 | Stanley ......................... 177/136 |
| 6,424,268 | B1 | * | 7/2002 | Isonaga et al. ................ 340/667 |
| 6,490,515 | B1 | * | 12/2002 | Okamura et al. ............... 701/49 |
| 6,518,083 | B2 | * | 2/2003 | Sato et al. ....................... 438/50 |
| 6,545,603 | B1 | | 4/2003 | Launay et al. |
| 6,831,565 | B2 | * | 12/2004 | Wanami et al. .............. 340/667 |
| 6,927,678 | B2 | * | 8/2005 | Fultz et al. .................... 340/438 |
| 7,043,997 | B2 | * | 5/2006 | Mattson et al. ................ 73/800 |
| 7,098,673 | B2 | * | 8/2006 | Launay et al. ................. 324/658 |
| 7,102,527 | B2 | * | 9/2006 | Shieh et al. ................... 340/602 |
| 7,217,891 | B2 | * | 5/2007 | Fischer et al. ................ 177/144 |
| 7,271,730 | B2 | * | 9/2007 | Kimura et al. ............... 340/667 |
| 7,469,594 | B2 | * | 12/2008 | Jitsui et al. ...................... 73/779 |

FOREIGN PATENT DOCUMENTS

| | | |
|---|---|---|
| EP | 1103796 | 5/2001 |
| FR | 2889304 | 2/2007 |
| WO | 00/25098 | 5/2000 |
| WO | 2007/012609 | 2/2007 |

OTHER PUBLICATIONS

International Preliminary Report on Patentability Chapter 1 and Written Opinion and English Translations for PCT/EP2006/064505, Jan. 29, 2008 (mailing date), Hitachi Computer Products (Europe) S.A.S., International Preliminary Report on Patentability Chapter 1 and Written Opinion and English translation for commonly owned PCT Patent Application PCT/EP2006/064505, listed as item #6 above.

Huang, S. M., et al.: "Tomographic Imaging of Two-Component Flow Using Capacitance Sensors," Journal of Physics E. Scientific Instruments, Mar. 1, 1989, pp. 173-177, vol. 22, No. 3, U.K.

* cited by examiner

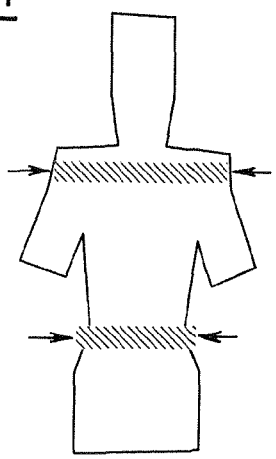
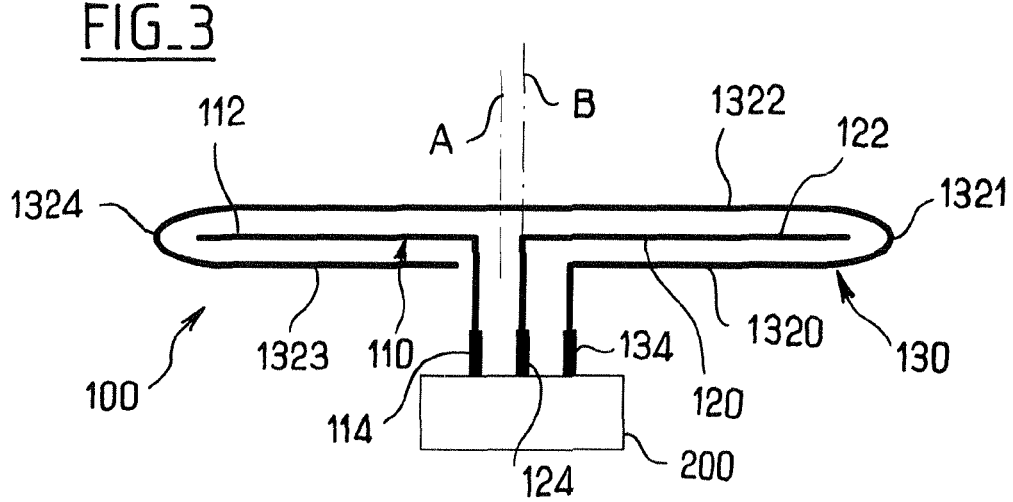
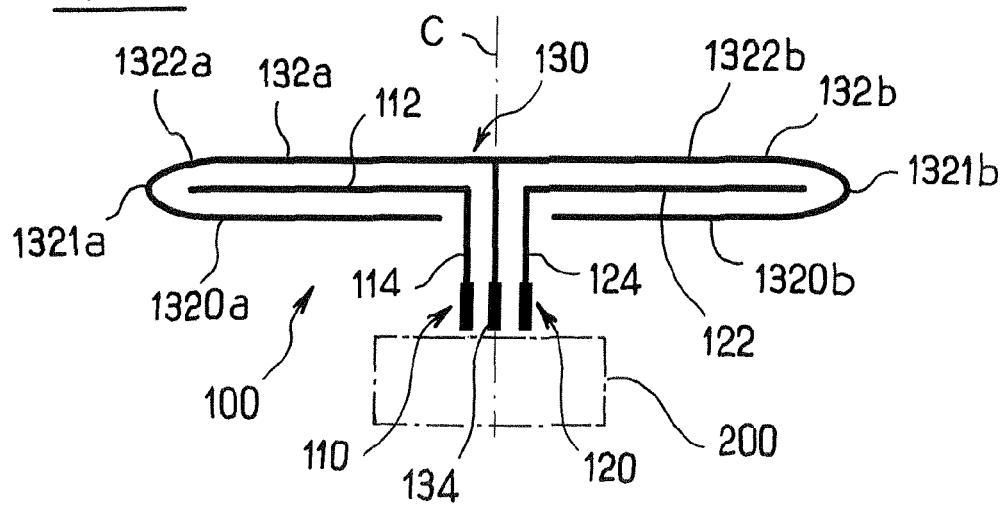

| Phases | | Measured on | C1 | C2 | U | A (other sensors) |
|---|---|---|---|---|---|---|
| NORMAL | C1 | C1 | 1 | 0 | 0 | 0 |
| | C2 | C2 | 0 | 1 | 0 | 0 |
| | U | U | 0 | 0 | 1 | 0 |
| | C1U | C1 | 1 | 1 | 0 | 0 |
| | C2U | C2 | 1 | 1 | 0 | 0 |
| | UC1 | U | 0 | 1 | 1 | 0 |
| | UC2 | U | 1 | 0 | 1 | 0 |
| | UC1C2 | U | 1 | 1 | 1 | 0 |
| GLOBAL | C1g | C1 | 1 | 0 | 0 | 1 |
| | C2g | C2 | 0 | 1 | 0 | 1 |
| | Ug | U | 0 | 0 | 1 | 1 |
| | C1Ug | C1 | 1 | 1 | 0 | 1 |
| | C2Ug | C2 | 1 | 1 | 0 | 1 |
| | UC1g | U | 0 | 1 | 1 | 1 |
| | UC2g | U | 1 | 0 | 1 | 1 |
| | UC1C2g | U | 1 | 1 | 1 | 1 |

1 = electric field applied to the electrode
0 = 0v or earth applied to the electrode

CAPACITIVE SENSOR FOR MORPHOLOGICAL DISCRIMINATION OF A MOTOR VEHICLE SEAT OCCUPANT

This present invention concerns the field of sensors.

More precisely this present invention concerns the field of capacitive sensors.

Even more precisely, this present invention concerns a capacitive sensor designed to allow morphological discrimination of a passenger in a vehicle seat.

In particular, this present invention finds its application, though not exclusively so, in airbag triggering control, in a motor vehicle.

In general, up to recent times, an airbag in a motor vehicle was triggered by an accelerometer in the event of an impact. This basic triggering took no account of the morphology of the occupant (child or adult of small corpulence or of large corpulence).

It should be noted that the airbag was triggered even if the seat was empty or occupied by a child seat. This latter case, which is very serious, is the cause of many fatalities.

It is for this reason that some vehicles are now provided with a switch that is used to de-activate the airbag when so required, such as when a child seat is mounted on the vehicle seat. This switch is generally associated with a luminous indicator on the instrument panel that is used to display the active or non-active state of the airbag.

Since 2003, a much more restrictive regulation has been promulgated in the United States (FMV SS 208) requiring that, from 2005, at least a third of all vehicles should be equipped with passenger presence detection systems, which is used to detect whether the seat is empty or occupied. The airbag must not be triggered if the seat is empty.

It should be noted that, in this context, the notion of "seat empty" encompasses 1) the case of a seat that is unoccupied or occupied by a child seat (with or without a child) and 2) the case of a seat occupied by a child of less than 6 years old.

Independently of the legislation to be imposed, commercial constraints both in the United States, and in the rest of the world, currently require "intelligent" triggering of the airbag, namely 1) no triggering of the airbag when the seat is empty, 2) no triggering of the airbag when the seat is occupied by a child seat (occupied or not), 3) no triggering of the airbag for a seat occupied by a child under 6 years old and 4) triggering of the airbag with power that is controlled according to the morphology of the occupant.

Three major classes of morphology are defined for adults, in accordance with certain statistical distributions, namely:

the 5th percentile (46-53 kg/1.4-1.65 m) corresponding mainly to women and to people of small corpulence, the 50th percentile (68-73 kg/1.7-1.8 m) corresponding to the majority of the population, and the 95th percentiles (94-98 kg/1.83-1.93 m) encompassing people of large corpulence.

Several technologies are used to detect the presence and the morphology of a passenger in a vehicle seat.

It is known, in particular, from the prior art, a) structures based on stress gauges placed at the points of attachment of the seat, b) pressure pads placed within a seat, under the seat cover, and c) capacitive sensors placed inside a seat, under the seat cover.

In this latter technology, it is possible to distinguish two major families, namely 1) that which detects the presence of an individual by compression of a foam pad placed between two conducting electrodes acting as a variable capacitor and 2) that based on a variable electric field or a fixed field.

In this latter case, the sensor generally includes coplanar electrodes placed under the seat cover. The presence of an individual in a vehicle seat changes the surrounding permittivity thus modifying the value of the sensor capacitance.

International Patent Publication WO/2000/025098 describes an example of such a sensor coupled to a load detection system. The means described in this document enable presence or position detection of a passenger in a seat. This type of sensor is generally satisfactory. However it has some drawbacks in the presence of a damp object placed on the seat or when the foam of the seat becomes impregnated with water vapour. In these conditions, the surrounding permittivity is modified by the presence of water, leading in certain conditions to classification errors and even to detection of the presence of a passenger when the seat is empty.

In conclusion, the different solutions hitherto proposed for controlled triggering of airbags in motor vehicles are not totally satisfactory.

This present invention has as its main objective to propose a new detection device that allows more reliable detection of the morphology of an individual or of an object placed on a seat in a motor vehicle.

This objective is attained in the context of this present invention by means of a detection assembly that includes a combination of firstly a sensor with three electrodes—two main electrodes covering different zones of the space, and the third, auxiliary electrode almost fully surrounding the two main electrodes—and secondly processing means connected to the electrodes in order to power the latter at controlled voltage levels, to make use of the signals taken from the latter in the form of the ratios between the two signals, and to deliver firstly binary signals representing the covering or the non-covering of a main electrode by comparison of the signal measured from the latter with a predetermined threshold, and secondly analog signals representing the percentage of coverage of at least one electrode.

As will be explained in greater detail later, use of the ratios between two signals enables us to overcome possible drifts as a function of the temperature or the surrounding moisture content.

This present invention also concerns seats fitted with the aforementioned detection assemblies as well as the sensors that are themselves used in these assemblies.

Figure 2B:
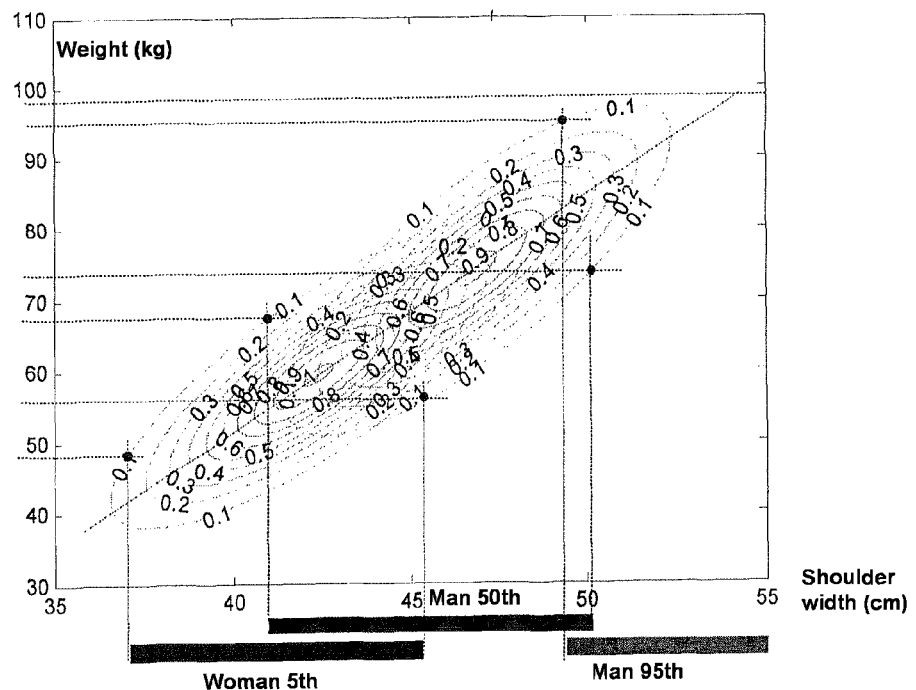
Figure 5:
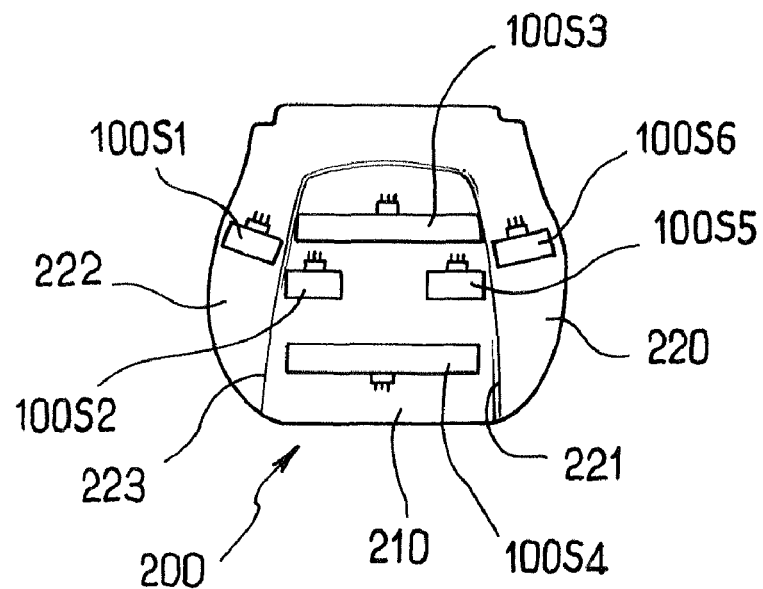
Figure 6:
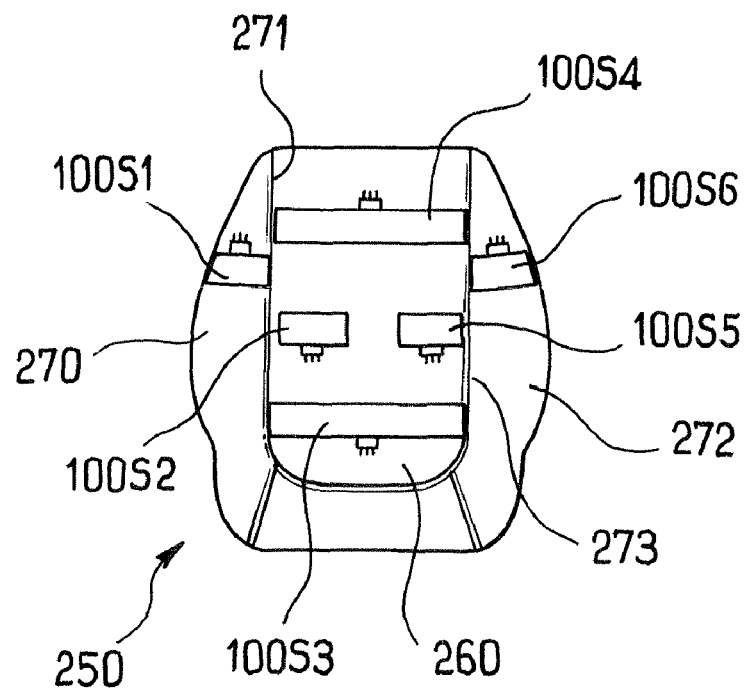
Figures 7, 8:
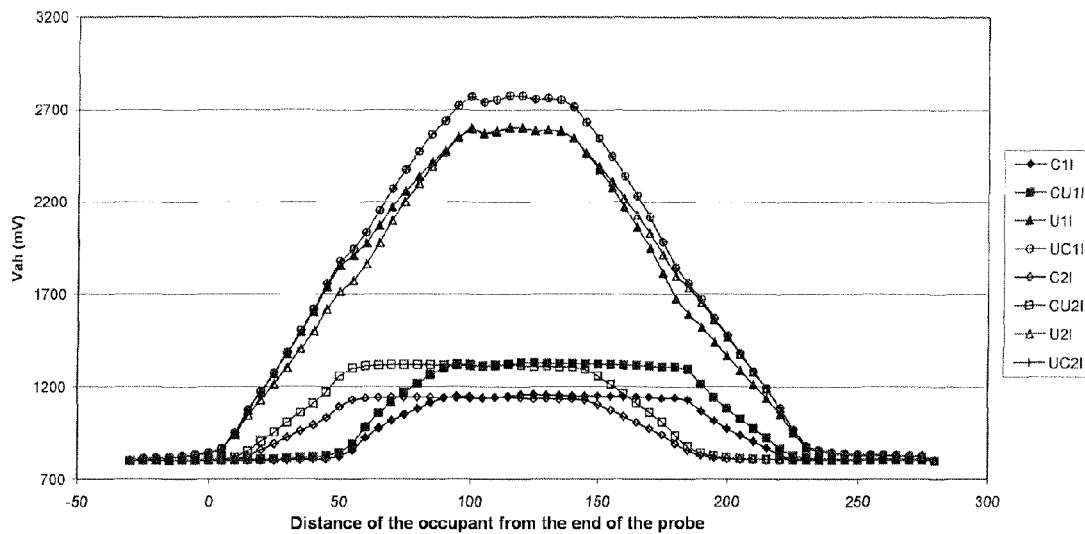

Other characteristics, aims and advantages of this present invention will appear on reading the detailed description that follows, with reference to the appended drawings, which are provided by way of non-limiting examples, and in which:

FIG. 1 schematically represents the modelling of a human body by geometric projection, FIGS. 2a and 2b represent statistical population distributions, FIG. 3 represents a plan view of a sensor according to a first embodiment of this present invention, FIG. 4 represents a plan view of a sensor according to a second embodiment of this present invention, FIGS. 5 and 6 schematically represent the implantation of sensors on the base or bottom and on the back of a seat in a motor vehicle, FIG. 7 represents the response curves obtained at the output of sensors according to this present invention, for different power and operating configurations, and FIG. 8 represents a table summarising the sequence of power feeding and processing of signals according to a preferred implementation of this present invention.

The approach that led the inventors to design this present invention is as follows.

The offset of a capacitive sensor is proportional to the value of the unloaded capacity, and called the "offset capacity".

As a consequence, it is desirable, in order to minimise sensor drift, to reduce the length of the electrodes of capacitive probes.

Moreover, it is desirable to have elementary sensor of sufficiently small size to be considered as an "elementary pixel" so as to obtain a binary detection signal: presence or not of a passenger covering the elementary sensor.

In order to be able to measure the morphology of the occupant of a seat, it is necessary to ascertain the determining criteria. To this end, the inventors have modelled the human body, as illustrated in FIG. 1, by geometrical projections and from various databases, in particular the databases of motor-vehicle manufacturers from different countries, reflecting the statistical distribution of populations such as 1) that published by the "Highway Safety Research Institute of Michigan" entitled "Michigan Highway Safety Research for 1977, including infants, children and youths up to 18 years old", 2) that published by the PSA group, or more precisely the physiology and biomechanics laboratory of the Peugeot-Renault association, and 3) that published by the SAE and known as "Caesar", which relates to the American population between 18 and 79 years old.

Statistical population distribution curves thus selected are illustrated in FIGS. 2a and 2b. An examination of these curves shows that although it is quite easy to distinguish a population of infants from a population of adults, it is nevertheless quite difficult to discriminate between the adults on the basis of morphological criteria.

However, the foregoing analysis led the inventors to choose, mainly as determining criteria to distinguish between the different sub-populations of individuals, in particular the infants and the adults firstly, and then secondly between the adults (5th and 95th percentile), regarding their morphology, the width of the thighs and of the buttock, for the seat bottom, and the width of the shoulders and buttock-shoulder distance for the seat back.

As a consequence, these considerations result in positioning the sensors in the corresponding zones of the seat bottom and of the seat back, as illustrated in FIGS. 5 and 6, which will be described in greater detail later.

More precisely, it should now be emphasised that on the bases just described, the inventors have determined as essential the positioning of the sensors known as "pixels", that is of the sensors used for all-or-none presence detection, on the lateral parts of the seats, adjacent to the stitching. These lateral parts, both on seat bottom and on seat back, are generally referred to as "bolsters" by specialists.

In theory, the foregoing approach requires a large number of sensors on the seat, in order to be able to correctly discriminate between the different morphologies, and this leads to prohibitive costs.

However this present invention enables to minimise the number of sensors required and as a consequence, overcomes these drawbacks.

This present invention also enables to minimise parasitic offset capacitance drifts.

The appended FIG. 3 shows an example of a sensor according to this present invention.

In FIG. 3, a sensor 100 with three electrodes 110, 120, 130 is seen.

In practice however, this present invention is not limited to sensors with three electrodes. This present invention can apply to sensors with a larger number of electrodes.

Electrodes 110 and 120, which will be called "main" electrodes, are intended essentially to conduct pixelation, that is all-or-none detection of presence or absence at their location.

Electrode 130, which will be called "auxiliary", is intended essentially to conduct detection of the analog type, that is to supply a signal representing the percentage by which it is covered by an individual or an object.

According to FIG. 3, each of the main electrodes 110, 120 includes a main rectilinear element 112, 122. These elements 112, 122 are aligned.

In a variant however, the main elements 112, 122 could have a different geometry, such as a sinusoidal, trapezoidal or other geometry.

At their adjacent ends, the main elements 112, 122 are fitted with connecting sections 114, 124. These are generally orthogonal to the main elements 112, 122. Each of the electrodes 110, 120 has thus a substantially "L-shaped" geometry.

The two electrodes 110, 120 are symmetrical in relation to a median plane (reference A in FIG. 3). This plane A is perpendicular to the main elements 112, 122 and parallel to the connecting sections 114, 124.

The auxiliary electrode 130 has substantially an open loop shape 132 that almost completely surrounds the main electrodes 110, 120. The open loop 132 is itself supplied at one of its ends with a connecting section 134, parallel to the aforementioned sections 114 and 124. The auxiliary electrode 130 thus takes a substantially "T" shape whose upright is composed of the connecting section 134, while the head is composed of the open loop 132. More precisely, the loop 132 is composed of three rectilinear sections 1320, 1322, 1323 connected together, in pairs, by curved sections 1321, 1324. Sections 1320 and 1323 have lengths that are substantially identical to the main elements 112, 122 of the main electrodes 110, 120. Section 1322 has a length that is substantially equal to twice that of the main elements 112, 122.

The sensor, composed of the three electrodes 110, 120, 130 thus exhibits a general symmetry in relation to a plane B, parallel to the aforementioned plane A, and passing through the median section of link 124 associated with electrode 120.

It is important that the electrodes 110, 120, 130 have known respective area ratios in relation to each other.

To this end, the three electrodes 110, 120, 130 preferably have an identical width e, the main elements 112, 122 have an identical length L and the distances separating the different electrode elements 112, 122, 132 and 114, 124, 134 are identical and constant.

The foregoing arrangements result in a definition of main electrodes 110, 120 with the same surface, and main electrodes 110, 120 that have a surface equal to a quarter of that of the auxiliary electrode 130.

However other geometries of the electrodes 110, 120, 130 can be chosen in the context of this present invention.

It is possible, for example, to use electrodes 110, 120 that have identical surfaces, but of different width and length, such as one electrode 110 with a width that is double that of electrode 120, but only half of its length.

Again, it is possible to use electrodes 110, 120 with different surfaces, in a known ratio, such as an electrode 110 with an area that is twice that of electrode 120.

By way of a non-limiting example, in the context of this present invention, the main elements 112, 122 of the main electrodes 110, 120 can have lengths of the order of 35 mm to 150 mm.

The sensor 100 illustrated in FIG. 3, and previously described, has thus 3 inputs 114, 124, 134 connected respectively to 3 electrodes 110, 120, 130. Henceforth, for convenience, these three electrodes will be respectively named "pixel C1" for electrode 110, "pixel C2" for electrode 120 and "electrode U" for electrode 130.

The connecting sections 114, 124, 134 are used to connect the electrodes 110, 120, 130 to power feeding and processing means as illustrated under the reference 200 in FIG. 3.

These means 200 preferably include means for power-feeding and for the removal of charge according to document WO-A-00/25098.

Thus, the means 200 preferably include electrical power-feeding means capable of delivering a continuous electrical voltage of controlled amplitude, an integrator stage with a capacitance switching system and control means designed to cyclically produce series of two sequences at a controlled frequency:

a first sequence T1 during which the electrical power-feeding means are connected to one of the electrodes 110, 120, 130 in order to apply an electric field thereto and to build up electric charge on this electrode, and then a second sequence T2 during which the electrical power-feeding means are disconnected from the aforementioned measuring probe electrode, and the latter is connected to a summing point of the integrator stage in order to transfer charges into the integrator stage, and obtain at the output thereof a signal representing the permittivity that exists between the electrode or the measuring probe and ground.

The sensor 100 can be achieved by means of any appropriate technology.

In the context of this present invention, the electrodes 110, 120, 130 are preferably deposited by a screen-printing process onto a thin, flexible thermoplastic material substrate suitable for incorporation into a seat in a motor vehicle. The aforementioned flexible substrate is advantageously made from polyethyleneterephthalate (PET) or from any other similar medium exhibiting a relatively small dielectric constant, typically with $\in < 4$, and stable with temperature and humidity, as well as a very low porosity to avoid water absorption.

The waterproofing of the sensor can be achieved by any appropriate means, such as by depositing a waterproof film over the whole surface of the sensor, or again by coating it in a waterproof material or foam, such as polyethylene (PE) for example, that exhibits a relatively small dielectric constant $\in < 4$ that is stable with temperature and humidity.

The means 200 are used to create a sequence of steps for power-feeding the electrodes 110, 120, 130 and for collecting signals from these electrodes, designed to enable the acquisition of elementary or combined pixelation data and/or analog signals.

Each step of the sequence includes the application of an electric field to one or more of the electrodes C1, C2, U, by applying a ground potential or a voltage of controlled level, typically equal to that of the electrode to be measured, to one or more other electrodes, and then measurement of the charge on the electrode in question.

Hereafter, in the description, we will assign to each respective measurement the name of the electrode on which the charge will be measured.

As illustrated in the first part of the table in FIG. 8, in the context of this present invention, the means 200 thus determine a measurement sequence with steps entitled C1, C2, U, C1U, C2U, UC1, UC2, UC1C2 and C1+C2.

Signal C1 from the first pixel is obtained by applying an electric field between C1 and U, that is between electrodes 110 and 130, and by measuring the electric charge on C1 (electrode 110) in relation to U (electrode 130), with pixel C2 (electrode 120) connected to the ground.

Signal C2 from the second pixel is obtained by applying an electric field between C2 and U, that is between electrodes 120 and 130, and by measuring the electric charge on C2 (electrode 120) in relation to U (electrode 130), with pixel C1 (electrode 110) connected to the ground.

Analog signal U is obtained by applying an electric field to electrode U, that is to electrode 130, in relation to electrodes C1 and C2, meaning electrodes 110 and 120, connected to the ground, and by measuring the electric charge on U (electrode 130).

The signal from pixel C1U is obtained by applying an electric field between C1 and U, that is between electrodes 110 and 130, and by measuring the electric charge on C1 (electrode 110) in relation to U (electrode 130), with pixel C2 (electrode 120) connected to the electric field in order to neutralise its influence.

The signal from pixel C2U is obtained by applying an electric field between C2 and U, that is between electrodes 120 and 130, and by measuring the electric charge on C2 (electrode 120) in relation to U (electrode 130), with pixel C1 (electrode 110) connected to the electric field in order to neutralise its influence.

Analog signal UC1 is obtained by applying an electric field to electrode U, that is to electrode 130, in relation to C1 or 110, and by measuring the electric charge on U (electrode 130), with pixel C2 (electrode 120) connected to the electric field in order to neutralise its influence.

Analog signal UC2 is obtained by applying an electric field to the electrode U or 130, in relation to C2 or 120, and by measuring the electric charge on U (electrode 130), with pixel C1 (electrode 110) connected to the electric field in order to neutralise its influence.

Analog signal UC1C2 is obtained by applying an electric field to electrodes U, C1 and C2 or 130, 110 and 120, and by measuring the electric charge on U (electrode 130). This measurement directly reflects the capacitance between electrode U and a target (such as a passenger).

By adding signals C1U and C2U in the means 200, a third pixel corresponding to length C1+C2 is obtained. This redundant information is used to increase the reliability and the precision of the detection used in this present invention.

The man skilled in the art will understand that the sensor according to this present invention enables us to obtain either so-called pixelation, all-or-none (on/off) signals on the presence/absence of an individual/object placed vertically on the concerned electrodes C1, C2, or analog measurements representing the percentage of coverage of the electrodes.

Moreover, the sensor of this present invention enables us, using only three inputs 114, 124, 134, to obtain 5 pixelation signals C1, C2, C1U, C2U, C1+C2 and 4 analog signals U, UC1, UC2 and UC1C2, and even several offset signals.

These different responses are combined together in the form of ratios, in order to minimise the offsets due to temperature and humidity. Since the surfaces of the electrodes 110, 120, 130 are proportional to each other to within a known coefficient Kn, then by combining certain ratios such as C1/U, C2/U or C1+C2/U for example, the offsets due to the natural parasitic capacitance between Cn and U are minimised, since the offsets that appear simultaneously in the numerator and the denominator cancel each other.

The responses thus obtained enable then the means 200 to morphologically discriminate between certain classes of passenger. Indeed, the combination of the signals thus obtained from the different sensors placed on a seat (of which a preferred configuration will be described later with reference to FIGS. 5 and 6) enables us to determine in particular the position of the passenger (and where appropriate to correct the raw measurements obtained if a laterally shifted positioning of the passenger is detected) and an order of magnitude of the width of the thighs and the buttock, and the width of the shoulders and the buttock-shoulder distance, which are crucial parameters, as indicated previously, in order to accomplish discrimination.

The different responses obtained by means of the sensor previously described according to this present invention are simulated in appended FIG. 7. The curves illustrated in FIG. 7 correspond to the responses obtained for the different steps of the sequence described previously, by progressively covering the electrodes by means of an object of length equal to the total length of the sensor and coming from the left.

As can be seen in FIGS. 5 and 6 attached, the seat bottom, as well as the back of the seat where appropriate, are preferably provided with several sensors according to this present invention. We will later describe a preferred implantation of these different sensors.

In the context of this present invention, the means 200 are preferably designed to reiterate an additional measurement sequence, described as "global", with steps similar to the steps described previously C1, C2, U, C1U, C2U, UC1, UC2, UC1C2 and C1+C2 and entitled "normal" sequences, respectively on each of these sensors, but connecting the other sensors simultaneously not to the ground but to the measurement potential.

The step sequence thus generated is illustrated at the bottom of FIG. 8. These steps are referenced C1g, C2g, Ug, C1Ug, C2Ug, UC1g, UC2g, UC1C2g and C1g+C2g.

The implementation of such a global sequence has several consequences.

To begin with, it allows us to neutralise the influence of the sensors other than that on which the measurement is performed.

Secondly, it allows us to determine whether the passenger has touched a metal part of the vehicle. Indeed, in this case, the potential is impose to the ground and there is then no difference between the values obtained for the so-called normal sequence and the so called global sequence. In the contrary, if the passenger does not touch a metal part of the vehicle, the sequence known as global enables us to force the potential that is described as "floating", and in these conditions, the values obtained with the normal sequence and with the global sequence are different. This very important characteristic enables us to remove the ambiguity between the passenger floating state and the passenger state at fixed potential, and also to detect the presence of a damp object by variation of the floating effect.

As indicated previously in the context of this present invention, the signals read from the electrodes 110, 120, 130 are electric charges converted into voltage by the means 200, and preferably using means in accordance with the arrangements described in document WO-A-00/25098.

A description will now be given for the sensor variant 100 illustrated in FIG. 4.

This figure shows a sensor 100 with two main electrodes 110, 120, and one auxiliary electrode 130. The geometry of the electrodes represented in FIG. 4 is designed so that this sensor 100 exhibits a perfect symmetry in relation to a plane (C) passing through the connecting section 134 of the auxiliary electrode 130.

This electrode 130, which is substantially "T" shaped, includes an upright composed of the rectilinear connecting section 134 and a head composed of two open loops 132a, 132b that are symmetrical in relation to plane C. Each of the loops 132a, 132b is composed of two rectilinear sections 1320a, 1320b, 1322a, 1322b, which are perpendicular to the plane of symmetry C, connected by incurving sections 1321a, 1321b.

The main electrodes 110, 120 are each shaped like an "L". They are symmetrical in relation to plane C. Each main electrode 110, 120 includes a main section 112, 122 that is preferably rectilinear (although a sinusoid, trapezium or other shape is also acceptable), and an orthogonal connecting section 114, 124.

The main elements 112, 122, are preferably aligned with each other, orthogonal to plane C and extending in opposite directions therefrom. They are also respectively surrounded by one of the loops 132a, 132b. The connecting sections 114, 124 are parallel to the plane of symmetry C and to the connecting sections 134.

A description will now be given of a preferred implantation of the sensors according to this present invention, in a seat of a motor vehicle, with reference to FIGS. 5 and 6.

FIG. 5 illustrates the bottom 200 of a seat in a motor vehicle, with a central part 210 and lateral parts 220, 222 separated from the central part 210 by stitches 221, 223. The lateral parts 220, 222 are generally known as "bolsters".

As can be seen in FIG. 5, according to the invention the bottom 200 of the seat is preferably equipped with:
sensors 100S1, 100S6 on each of the two lateral parts 220, 222, perpendicular to the stitches 221, 223 and on the median axis of the seat between the front and the rear,
sensors 100S2, 100S5 placed on the central part 210, on the other side of the stitches 221, 223, that is toward the centre of the seat; sensors 100S2 and 100S5 are offset toward the front in relation to sensors 100S1 and 100S6 respectively,
a sensor 100S3 whose length is equal to the width of the central part 210 between the stitches 221, 223 positioned toward the rear of the seat at ⅔ of the way between the front and the rear, and
a sensor 100S4 whose length is equal to the width of the central part 210 between the stitches 221, 223 positioned toward the front of the seat at ⅓ of the way between the front and the rear.

In the context of the invention, it is possible to consider providing only the seat bottom as illustrated in FIG. 5.

However, the back of the seat is also preferably equipped with sensors. Preferably also, the implantation of the sensors in the back of the seat is identical to the implantation on the seat bottom.

Thus, can be seen in FIG. 6, is a seat back 250 with a central part 260 and lateral parts 270, 272, separated from the central part 260 by stitches 271, 273. The lateral parts 270, 272 are generally known as "bolsters".

This seat back 250 is fitted with:
sensors 100S1, 100S6 on each of the two lateral parts 270, 272, perpendicular to the stitches 271, 273 and substantially at ⅔ of the way up the back,
sensors 100S2, 100S5 placed on the central part 260 on the other side of the stitches 271, 273, that is toward the centre of the back; the sensors 100S2, 100S5 are offset downwards respectively in relation to sensors 100S1 and 100S6, that is substantially on the median axis of the height of the back 250,
a sensor 100S3 whose length is equal to the width of the central part 260 between the stitches 271, 273 positioned toward the bottom of the back and substantially at about ⅓ the height of the latter, and a sensor 100S4 whose length is equal to the width of the central part 260 between the stitches 271, 273 positioned toward the top of the back and substantially ⅔ of the way up the latter.

Each of the sensors 100S1, 100S2, 100S3, 100S4, 100S5, 100S6 includes three electrodes 110, 120, 130 according to the arrangements previously described. Every sensors 100S1, 100S2, 100S3, 100S4, 100S5, 100S6 are preferably connected to common processing means 200.

The means 200 can easily determine the morphology type of the individual detected on the seat, by comparing the pixel and analog signals obtained as a result of processing the signals taken from the electrodes 110, 120, 130 with the signals contained in a reference file, and thus to control an airbag.

The man skilled in the art will understand that this present invention enables precise detection that enables discrimination between the morphology of different passengers, with a small number of sensors and therefore at reduced cost.

This present invention is naturally not limited to the particular embodiments that have been described above, but extends to any variant that conforms to its spirit.

The invention claimed is:

1. A detection assembly for detecting a morphology of a person, comprising:
    a sensor that comprises (i) first and second main linear electrodes covering different zones of a plane, and (ii) a third auxiliary linear electrode having substantially at least an open loop shape and almost entirely surrounding the first and second main electrodes in said plane, and
    a processing unit connected to the electrodes, wherein the processing unit is for:
        (i) powering the electrodes at controlled voltage levels,
        (ii) making use of signals taken from the electrodes in a form of ratios between two of the signals, and
        (iii) delivering binary signals representing a percentage by which a main electrode is covered by comparison of a signal taken from the main electrodes with a predetermined threshold, and analog signals representing a percentage of covering of at least one electrode.

2. The assembly according to claim 1, wherein the first and second main electrodes comprise main elements that extend in opposite directions in relation to a general plane of symmetry.

3. The assembly according to claim 2, wherein each of the main electrodes is "L" shaped, and the auxiliary electrode is "T" shaped with an upright and a head formed from an open loop that surrounds the main elements of the main electrodes.

4. The assembly according to claim 2, wherein each of the main electrodes is "L" shaped, and the auxiliary electrode is "T" shaped with an upright and a head formed from two open loops that respectively surround the main elements of the main electrodes.

5. The assembly according to claim 1, wherein the main electrodes comprise main elements that are rectilinear and aligned with each other.

6. The assembly according to claim 1, wherein the main electrodes comprise main elements that are non-rectilinear.

7. The assembly according to claim 1, wherein the electrodes are positioned on a flexible support.

8. The assembly according to claim 1, wherein the electrodes are positioned on a support made from any thermoplastic material.

9. The assembly according to claim 1, wherein the electrodes are positioned on a support made from a material that is stable with temperature and humidity.

10. The assembly according to claim 1, wherein the electrodes are positioned on a support exhibiting a dielectric constant of $\varepsilon < 4$.

11. The assembly according to claim 1, wherein the sensor is coated with a waterproof film, that is stable with temperature and humidity and of low permittivity.

12. The assembly according to claim 1, wherein the processing unit is for applying an electric field to one or more of the electrodes, by applying a ground potential or a voltage at a controlled level, typically equal to that of an electrode to be measured, on one or more other of the electrodes, and then measuring a charge on the electrode to be measured.

13. The assembly according to claim 12, wherein the assembly comprises several sensors and the processing unit is for reiterating a measurement sequence successively on each sensor by bringing the other sensors to a measurement potential.

14. The assembly according to claim 1, wherein the processing unit is for obtaining:
    a first signal from a first pixel by applying an electric field between the first main electrode and the auxiliary electrode, and by measuring an electric charge on the first main electrode in relation to the auxiliary electrode, with a pixel of the second main electrode connected to a ground,
    a second signal from the second pixel by applying an electric field between the second main electrode and the auxiliary electrode, and by measuring an electric charge on the second main electrode in relation to the auxiliary electrode, with a pixel of the first main electrode connected to the ground,
    a first analog signal by applying an electric field to the auxiliary electrode, in relation to the main electrodes, connected to the ground, and by measuring an electric charge on the auxiliary electrode,
    a first pixel signal by applying an electric field between the first main electrode and the auxiliary electrode, and by measuring the electric charge on the first main electrode in relation to the auxiliary electrode, with the second main electrode connected to the electric field in order to neutralize its influence,
    a second pixel signal by applying an electric field between the second main electrode and the auxiliary electrode, and by measuring the electric charge on the second main electrode in relation to the auxiliary electrode, with the first main electrode connected to the electric field in order to neutralize its influence,
    a second analog signal by applying an electric field to the auxiliary electrode, in relation to the first main electrode, and by measuring the electric charge on the auxiliary electrode, with the second main electrode connected to the electric field in order to neutralize its influence,
    a third analog signal by applying an electric field to the auxiliary electrode, in relation to the second main electrode, and by measuring the electric charge on the auxiliary electrode, with the first main electrode connected to the electric field in order to neutralize its influence,
    a fourth analog signal by applying an electric field to the main and auxiliary electrodes, and by measuring the electric charge on the auxiliary electrode.

15. The assembly according to claim 1, wherein the processing unit is for carrying out an addition of first and second pixel signals.

16. The assembly according to claim 1, wherein the processing unit is for conducting measurements of pixelation by using main electrodes that are generally rectilinear.

17. The assembly according to claim 1, wherein the processing unit is designed to perform analog measurements by using the auxiliary electrode.

18. A sensor for a detection assembly for detecting a morphology of a person, the sensor comprising:
- (i) first and second main linear electrodes covering different zones of a plane, and
- (ii) a third auxiliary linear electrode having substantially at least an open loop shape and almost entirely surrounding the first and second main electrodes in said plane, wherein the assembly further comprises a processing unit connected to the electrodes, wherein the processing unit is for:
- (i) powering the electrodes at controlled voltage levels,
- (ii) making use of signals taken from the electrodes in a form of ratios between two of the signals, and
- (iii) delivering binary signals representing a percentage by which a main electrode is covered by comparison of a signal taken from the main electrodes with a predetermined threshold, and analog signals representing a percentage of covering of at least one electrode.

19. A motor vehicle seat that comprises at least one detection assembly for detecting a morphology of a person, comprising:
- a sensor that comprises (i) first and second main linear electrodes covering different zones of a plane, and (ii) a third auxiliary linear electrode having substantially at least an open loop shape and almost entirely surrounding the first and second main electrodes in said plane, and
- a processing unit connected to the electrodes, wherein the processing unit is for:
  - (i) powering the electrodes at controlled voltage levels,
  - (ii) making use of signals taken from the electrodes in a form of ratios between two of the signals, and
  - (iii) delivering binary signals representing a percentage by which a main electrode is covered by comparison of a signal taken from the main electrodes with a predetermined threshold, and analog signals representing a percentage of covering of at least one electrode.

20. The seat according to claim 19, wherein the at least one detection assembly comprises several sensors.

21. The seat according to claim 20, wherein the sensors are connected to common processing unit.

22. The seat according to claim 19, wherein the seat comprises sensors on a seat bottom.

23. The seat according to claim 19, wherein the seat comprises sensors on a seat back.

24. The seat according to claim 19, wherein the seat comprises sensors on lateral parts of at least one of a seat bottom and a seat back.

25. The seat according to claim 24, wherein the seat comprises sensors on a central part of at least one of the seat bottom and the seat back.

26. The seat according to claim 19, wherein a seat bottom comprises:
- a first set of sensors, on each of two lateral parts of the seat bottom, perpendicular to stitches of the seat bottom and on a median axis of the seat bottom between a front and a rear of the seat bottom,
- a second set of sensors, placed in a central part of the seat bottom, on an other side of the stitches, toward a center of the seat bottom, with the second set of sensors offset toward the front of the seat bottom, respectively in relation to the first set of sensors,
- a first sensor whose length is equal to a width of the central part between the stitches, positioned toward the rear of the seat bottom, at ⅔ of a length between the front and the rear, and
- a second sensor whose length is equal to the width of the central part between the stitches, positioned toward the front of the seat bottom at ⅓ of the length between the front and the rear.

27. The seat according to claim 19, wherein a seat back comprises:
- a first set of sensors, on each of two lateral parts of the seat back, perpendicular to stitches of the seat back, and at substantially ⅔ of the seat back upwards,
- a second set of sensors, positioned on a central part of the seat back, on an other side of the stitches, toward a center of the seat back, with the second set of sensors offset downwards respectively in relation to the first set of sensors, substantially on a median axis of a height of the seat back,
- a first sensor whose length is equal to a width of the central part of the seat back between the stitches, positioned toward a bottom of the seat back, substantially at ⅓ the height of the seat back, and
- a second sensor whose length is equal to the width of the central part of the seat back between the stitches, positioned toward a top of the seat back and substantially at ⅔ the height of the seat back.

28. The seat according to claim 19, wherein the seat comprises sensors positioned to measure a width of thighs and buttocks of a passenger.

29. The seat according to claim 19, wherein the seat comprises sensors positioned to measure a width of shoulders and a buttock-shoulder distance of a passenger.

* * * * *